US005739421A

United States Patent [19]

Iochi et al.

[11] Patent Number: 5,739,421

[45] Date of Patent: Apr. 14, 1998

[54] LEAK DIAGNOSIS SYSTEM FOR EVAPORATIVE EMISSION CONTROL SYSTEM

[75] Inventors: Atsushi Iochi, Machida; Kenichi Goto, Zama, both of Japan

[73] Assignee: Nissan Motor Co.Ltd., Yokohama, Japan

[21] Appl. No.: 759,753

[22] Filed: Dec. 3, 1996

[30] Foreign Application Priority Data

Dec. 8, 1995 [JP] Japan .................................... 7-320670

[51] Int. Cl.[6] ......................... G01M 15/00; F02M 25/08; F02B 77/08

[52] U.S. Cl. ......................... 73/49.7; 73/40.5 R; 73/118.1; 123/519; 340/451

[58] Field of Search .................................... 73/116, 117.2, 73/117.3, 118.1, 49.7, 40.5 R; 123/519; 340/451

[56] References Cited

U.S. PATENT DOCUMENTS 5,467,641 11/1995 Williams et al. ......................... 73/49.7
5,477,842 12/1995 Maruyama et al. ..................... 123/519
5,490,414 2/1996 Dürschmidt et al. .................. 73/118.1
5,495,749 3/1996 Dawson et al. ......................... 73/118.1
5,560,243 10/1996 Wild ....................................... 73/118.1
5,560,346 10/1996 Isobe et al. ............................. 123/519

FOREIGN PATENT DOCUMENTS 4-231651 8/1992 Japan .
4-362264 12/1992 Japan .
5-215020 8/1993 Japan .
7-12014 1/1995 Japan .
7-109937 4/1995 Japan .

*Primary Examiner*—George M. Dombroske
*Attorney, Agent, or Firm*—Foley & Lardner

[57] ABSTRACT

A leak diagnosis system for an evaporative emission control system executes a correction process of diagnosis decision value. When the purge control of the evaporative emission control system is not executed, a purging line of the system is set in the atmospheric condition for a predetermined time. A pressure sensor installed in the purging line detects a pressure value $V_{A0}$ in the atmospheric condition. A control unit of the leak diagnosis system determines a leak decision value $V_{P0}$ on the basis of the atmospheric pressure detection value and an equation $V_{P0}=V_{A0}+\Delta V_0$ where $\Delta V_0$ is a difference between the output value in the predetermined positive pressure $P_0$ and the output value $V_{A0}$ in the atmospheric pressure condition and is constant. Therefore, it becomes possible to accurately execute the leak diagnosis.

10 Claims, 4 Drawing Sheets

LEAK DIAGNOSIS SYSTEM FOR EVAPORATIVE EMISSION CONTROL SYSTEM

BACKGROUND OF THE INVENTION

The present invention relates to a leak diagnosis system for an evaporative emission control system of an internal combustion engine, and more particularly to a leak diagnosis system which accurately executes the leak diagnosis on the basis of a pressure value in the evaporative emission control system.

Various diagnosis systems for an evaporative emission control system connected to an internal combustion engine for an automotive vehicle have been proposed, for example, in Japanese Patent Provisional Publication Nos. 4-362264 and 7-12014 which are arranged to diagnose the leakage in the evaporative emission control system by detecting the change of the pressure in various conditions through a pressure sensor set in the evaporative emission control system.

However, the output value of such a pressure sensor is deviated by each individual and influenced by the temperature and the like. Therefore, conventional leak diagnosis systems have been arranged to set a diagnosis limit value to have a predetermined allowance upon taking into consideration the deviation of the output value of the pressure sensor. Such a diagnosis limit value including a predetermined allowance has invited a difficulty in an accurate execution of the leak diagnosis.

SUMMARY OF THE INVENTION

It is object of the present invention to provide an improved leak diagnosis system which accurately executes a leak diagnosis of an evaporative emission control system of an internal combustion engine.

According to the present invention, there is provided a leak diagnosis system for an evaporative purge system which is connected to an internal combustion engine having an air induction passage. The leak diagnosis system comprises an adsorbing means, a purging means, a base-pressure setting means, a diagnosing-value correcting means and a diagnosing means. The adsorbing means temporally adsorbs evaporative fuel from the fuel tank. The purging means purges the evaporative fuel of the adsorbing means to the engine. The pressure detecting means detects a pressure value of the evaporative emission control system except for the fuel tank. The base-pressure setting means puts the pressure detecting means in the atmospheric pressure and obtains the pressure value of the pressure detecting means in the atmospheric pressure. The diagnosing-value correcting means corrects the detection value of the pressure detecting means on the basis of the detected value of the pressure detecting means in the atmospheric pressure. The diagnosing means diagnoses the leak condition of the evaporative purge system on the basis of the pressure value of the pressure detecting means.

According to another aspect of the present invention, there is provided a method A method for diagnosing a leak in an evaporative purge system connected to an internal combustion engine having an air induction passage, the method comprises a step of temporally adsorbing evaporative fuel from a fuel tank storing fuel for the engine; a step of purging the stored evaporative fuel to the engine; a step of detecting a diagnosis pressure value of the evaporative emission control system except for the fuel tank; a step of putting a pressure detected portion in the atmospheric pressure and obtaining the pressure value in the atmospheric pressure; a step of correcting the detected diagnosis pressure value on the basis of the detected pressure value in the atmospheric pressure; and a step of diagnosing the leak condition of the evaporative purge system on the basis of the corrected diagnosis pressure value.

DETAILED DESCRIPTION OF THE INVENTION

Referring to FIGS. 1 to 4, there is shown an embodiment of a leak diagnosis system for an evaporative emission control system according to the present invention.

Figure 1:
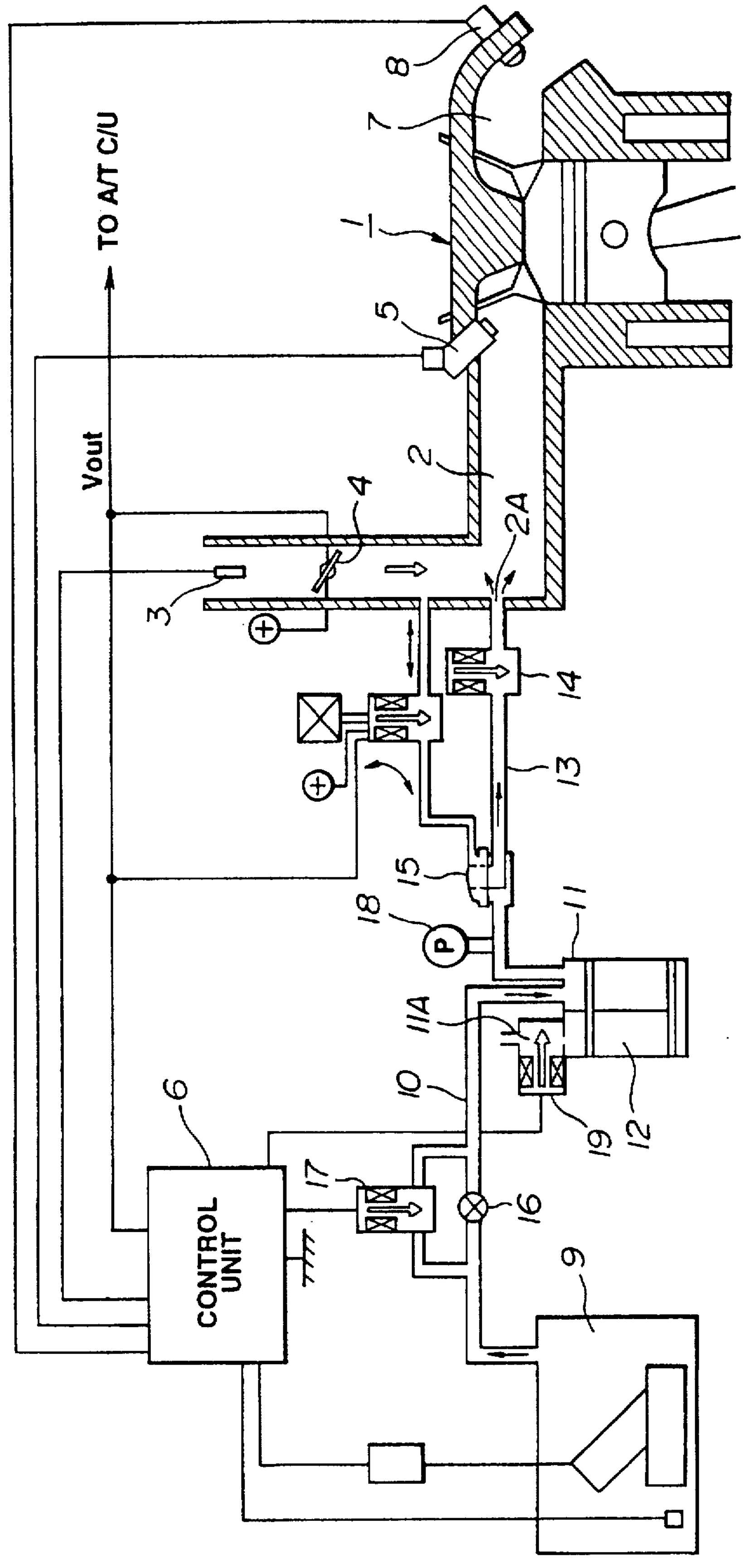
FIG. 1 is a block diagram of an evaporative emission control system including a leak diagnosis system according to the present invention.

As shown in FIG. 1, the evaporative emission control system is connected to an internal combustion engine 1 for an automotive vehicle. The internal combustion engine 1 includes an air flow meter 3 for detecting an intake air amount, a throttle valve 4 interconnected with an acceleration pedal to control the intake air amount which are installed in an air induction passage 2 of the engine 1. At an intake manifold located at a downstream portion of the air induction passage 2, a fuel injection valve 5 is installed by each cylinder of the engine 1. The control of a fuel injection amount through the fuel injector 5 is executed by a control unit 6 comprising a microcomputer.

An air/fuel ratio sensor 8 is disposed in an exhaust passage 7 connected to the engine 1. The air/fuel ratio sensor 8 detects an air/fuel ratio of the intake air/fuel mixture by detecting an oxygen density of the exhaust gases at a collector portion of an exhaust manifold in the exhaust passage 7.

Evaporative fuel in a fuel tank 9 is led to a canister 11 through an evaporative fuel passage 10 which fluidly communicates the fuel tank 9 and the canister 11. The evaporative fuel from the fuel tank 9 is temporally adsorbed by adsorbent such as activated carbon in the canister 11. An upper space portion of the canister 11 is connected to a purge port 2A formed at a downstream portion of a throttle valve 4 in the intake passage 2 through a purging passage 13.

The canister 11 includes a fresh air passage 11A for leading fresh air to the canister 11. A vent control valve 19 functioning as a fresh-air lead selecting means is disposed in the fresh air passage 11A. The vent control valve 19 is set to be opened according to a signal from the control unit 6 when the purge control is normally executed. When the leak diagnosis is executed, the vent control valve 18 is opened and closed according to a signal from the control unit 6.

A purge control valve 14 and a purge cut valve 15 which are controlled by the control unit 6 are installed in the purging passage 13. The purge control valve 14 is a valve of a step-motor type or duty drive type and functions to control the purged mixture to the intake passage 2 so that a purge ratio (a purged mixture amount/intake air amount) is controlled according to the intake air amount. The purge cut valve 15 is a ON-OFF valve for cutting the communication between the air induction passage 2 and the purging passage 13. More particularly, the purge cut valve 15 is opened when the throttle valve 4 is opened, and the purge cut valve 15 is firmly closed when the throttle valve 4 is fully closed. The purge cut valve 15 is opened and closed according to the signals from the control unit 6 during the leak diagnosis.

A vacuum cut valve 16 and a bypass valve 17 for the vacuum cut valve 16 are disposed in the evaporative fuel passage 10. The vacuum cut valve 16 is a one-way valve for preventing the intake vacuum of the engine 1 from being supplied to the fuel tank 9. The bypass valve 17 used in the leak diagnosis is arranged to bypass the vacuum cut valve 16 and is normally closed. Only when the leak diagnosis is executed, the bypass valve 17 is opened to lead the positive pressure in the fuel tank 9 to the purging passage 13.

A purge line pressure sensor 18 functioning as a pressure detecting means is disposed in the purging passage 13 and outputs a detection output V indicative of the purge line pressure P to the control unit 6.

Figure 2:
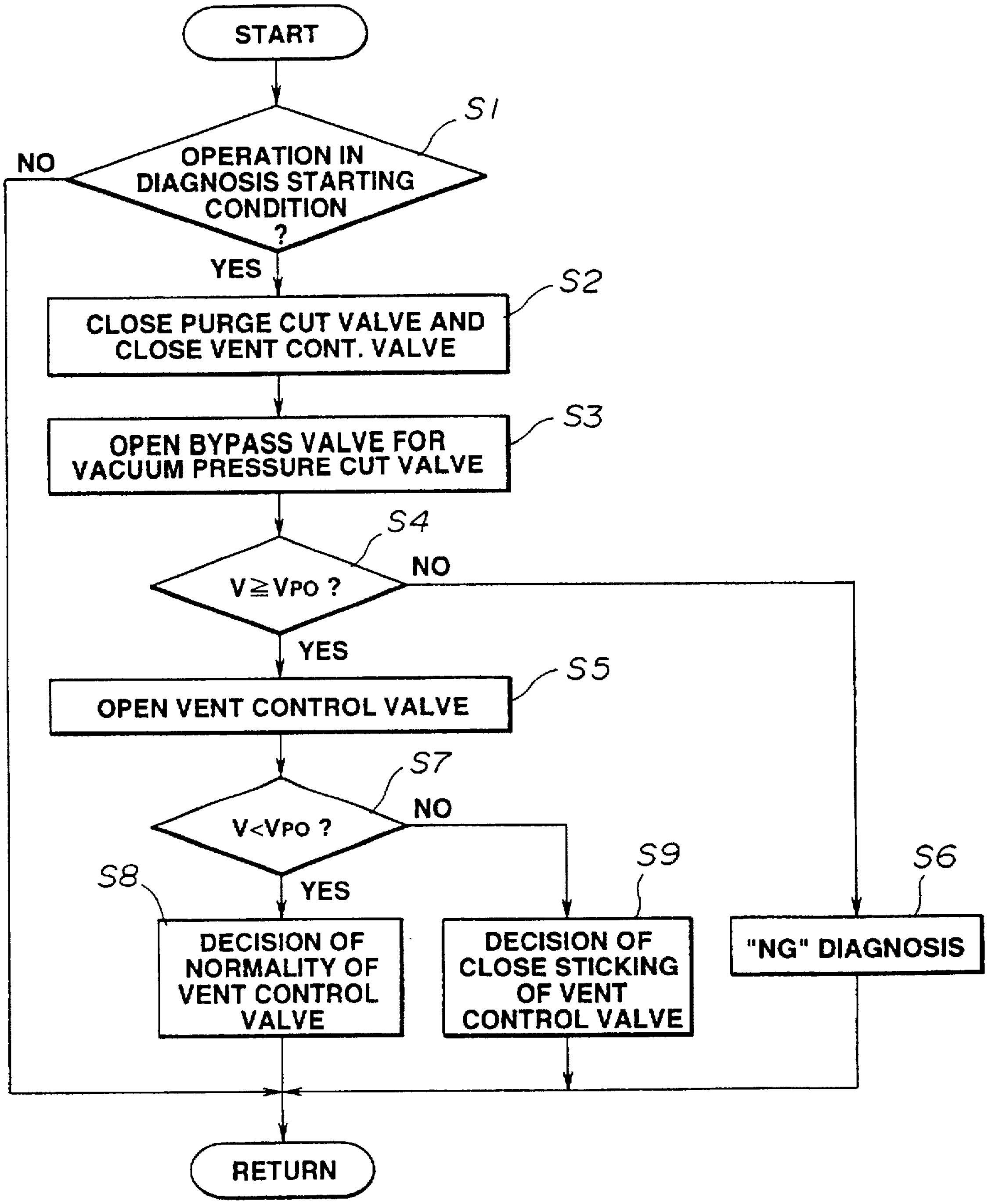
FIG. 2 is a flowchart of a diagnosis routine to determine whether there is any trouble in the evaporative emission control system.

The control unit 6 is arranged to execute the leak diagnosis of the above-mentioned evaporative emission control system as shown in a flowchart of FIG. 2.

The routine of the leak diagnosis will be discussed with reference to the flowchart of FIG. 2.

At a step S1, it is decided whether a predetermined diagnosis condition such as the following condition is satisfied or not.

(1) Purging of the evaporative emission control is stopped.

(2) Water temperature TWN ranges from 70° C. to 100° C. (70° C.<TWN<100° C.).

(3) Engine rotation speed MNRPM ranges from 550 rpm to 1800 rpm (550 rpm≦MNRPM<1800 rpm).

(4) Pulse width Tp of the fuel injection ranges from 0 ms to 5 ms (0 ms≦Tp<5 ms).

(5) Vehicle speed (VSP) ranges from 0 km/h to 20 km/h (0 km/h≦VSP<20 km/h).

(6) Deviation ratio of a correction coefficient of air-fuel ratio feedback is set small and is generally 100%.

When the decision at the step S1 is "YES", the routine proceeds to a step S2.

At the step S2, the purge control valve 15 and the vent control valve 19 are both closed.

At a step S3, the bypass valve 17 for the vacuum cut valve 16 is opened.

At a step S4, it is decided whether the purge line pressure P is raised to a predetermined positive pressure $P_0$ or not. More particularly, it is decided as to whether the output value V of the pressure sensor 18 is reached to the pressure value $V_{P0}$ corresponding to the positive pressure $P_0$. When it is decided that the purge line pressure becomes higher than the predetermined positive pressure $p_0$, the routine proceeds to a step S5. On the other hand, when the decision at the step S4 is "NO", that is, when the line pressure P does not becomes greater than the predetermined pressure $P_0$ although the control unit 6 outputted command signals to both the purge cut valve 15 and the vent control valve 19 to be closed and the bypass valve 17 to be opened, the routine proceeds to a step S6.

At the step S6, the control unit 6 decides that the evaporative emission control system does wrong, that is, at least one of the close sticking of the bypass valve 17, leakage of evaporative fuel, the open sticking of the vent control valve 19 or no-vapor existence is generating. Therefore, the control unit 6 outputs a NG signal indicative of the wrong condition of the evaporative emission control system. Then, the routine returns to a step S1.

At the step S5, the control unit 6 outputs an open commanding signal to the vent control valve 19 to be opened.

Following the step S5, the routine proceeds to a step S7 wherein the control unit 6 decides as to whether the purge line pressure P becomes smaller than the predetermined pressure $P_0$. When the decision at the step S7 is "YES", the routine proceeds to a step S8. When the decision at the step S7 is "NO", the routine proceeds to a step 9.

That is, if the purge line pressure P is decreased by executing an opening operation of the vent control valve 19, it becomes clear that the operation of the vent control valve 19 is normal. Therefore, the routine proceeds to the step S8 wherein the control unit 6 decides that the vent control valve 19 is normal. Then, the routine returns to the step S1. If the purge line pressure P is not decreased by executing the opening operation of the vent control valve 19, it becomes clear that the operation of the vent control valve 19 goes wrong such that a close sticking is generated at the vent control valve 19. Therefore, the routine proceeds to the step S9 wherein the control unit 6 decides that the vent control valve 19 is generating the close sticking. Then, the routine returns to the step S1.

More detailed operation of the flowchart of FIG. 2 will be discussed hereinafter with reference to a time chart of FIG. 3.

Figures 3A, 3B, 3C, 3D, 3E:
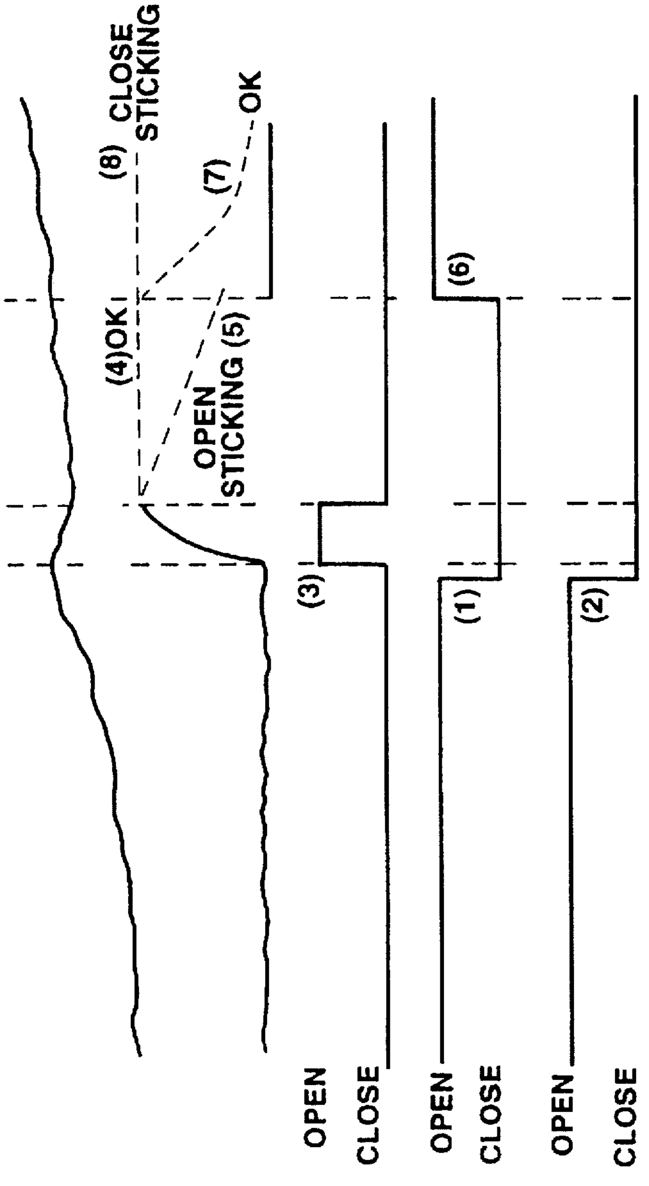
FIGS. 3A to 3E are time charts which show operating conditions of valves and the pressure condition in a purge line and a fuel tank.
Figure 4:
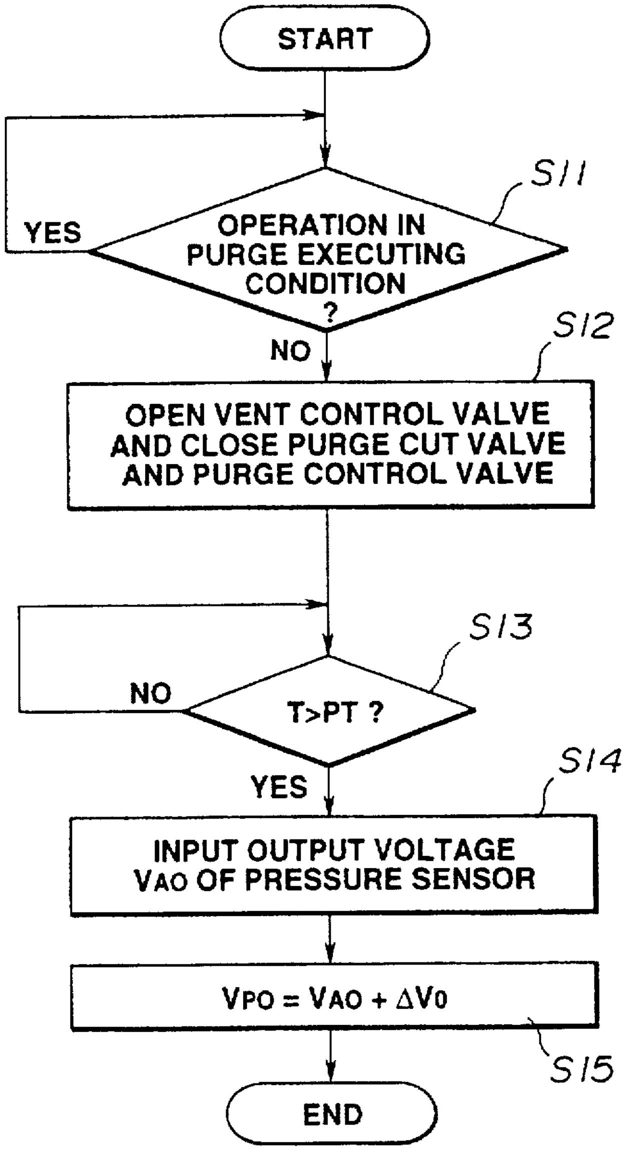
FIG. 4 is a flowchart of a correcting routine to correct the deviation of a pressure sensor of the leaked diagnosis system.

FIG. 3A shows a change of an inner pressure in the fuel tank 9. FIG. 3B shows a change of the purge line pressure P. FIG. 3C shows an opening and closing condition of the bypass valve 17 for the vacuum cut valve 16. FIG. 3D shows an opening and closing condition of the vent control valve 19. FIG. 3E shows an opening and closing condition of the purge cut valve 15.

In a case (I) that the vent control valve 19 and the purge cut valve 15 are closed as shown at reference marks (1) and (2) of FIGS. 3D and 3E and the bypass valve 17 is then opened as shown at a reference mark (3) of FIG. 3C, if the purge line pressure is decreased as shown at a reference mark (5), the vent control valve 19 may be generating a open sticking. If the purge line pressure is increased as shown at a reference mark (4) in the above-mentioned case (I), it is decided that the vent control valve 19 is normally operated.

In a case (II) that the bypass valve 17 is opened as shown by a reference mark (6) of FIG. 3D, if the purge line pressure is decreased as shown by a reference mark (7) of FIG. 3B, it is decided that the vent control valve is normally operated. If the purge line pressure is not decreased as shown by a reference mark (8) of FIG. 3B in the case (II), it is decided that the vent control valve 19 is generating a close sticking.

Before the above-mentioned leak diagnosis is executed, a correcting process for correcting the deviation of the output characteristics of the pressure sensor 18 is executed. This deviation correcting process will be discussed with reference to a flowchart of FIG. 4.

At a step S11 the control unit 6 decides as to whether the condition for executing the purge control is satisfied or not. When it is decided that the purge control executing condition is not satisfied, that is, when the purge control is not executed and the correcting process executing condition is satisfied, the routine of FIG. 4 proceeds to a step S12. When the purge control executing condition is satisfied, the step S11 is repeated. That is, the control unit 6 awaits to a time the purge control executing condition is not satisfied.

At a step S12 the control unit 6 outputs signals for opening the vent control valve 19 and closing the purge cut valve 15 and the purge control valve 14 to set the purge passage 13 with the pressure sensor 18 into the atmospheric pressure condition.

At a step S13 the control unit 6 awaits for a predetermined time period.

At a step S14 the control unit 6 reads an output valve $V_{A0}$ of the pressure sensor 18.

At a step S15 the control unit 6 determines the decision value $V_{P0}$ from the value $V_{A0}$ and the following equation (a), $$V_{P0}=V_{A0}+\Delta V_0 \qquad (a)$$

where $\Delta V_0$ is a difference between the output value in the predetermined positive pressure $P_0$ and the output value in the atmospheric pressure condition. Since the pressure sensor 18 performs a generally proportional relationship between the output value and the detecting pressure wherein the proportional relationship has a constant gradient and a deviated intercept, the difference $\Delta V_0$ is obtained as a constant value.

By this execution of the correcting process, even if the pressure sensor 18 has a deviation in its output characteristic among individuals, the deviations among the individuals can be canceled by using the sum of the difference $\Delta V_0$ and the output value $V_{A0}$ of the pressure sensor 18 in the atmospheric pressure as the decision output voltage $V_{P0}$. Therefore, it becomes possible to finely execute the leak diagnosis of the evaporative emission control system.

Although the preferred embodiment of the present invention has been shown and described to be applied to a leak diagnosis system executing a diagnosis according to the increase of the evaporative fuel pressure supplied to the pressure sensor 18, it will be understood that the present invention may be applied to the other leak diagnoses executed as to the other portions. For example, such method and system according to the present invention may be applied to the leak diagnosis which is executed in a case that the vent control valve 19 and the bypass valve 17 are closed and the purge cut valve 15 and the purge control valve 14 are opened to lead the intake vacuum of the engine 1 to the evaporative fuel passage 10 and the purging passage 13 while closing the fuel tank 9, then the purge cut valve 15 and the purge control valve 14 are closed, the changing speed in the evaporative emission control system is detected to decide the leakage of the evaporative fuel passage 10 and the purging passage 13 when the changing speed is greater than a predetermined value.

Although the preferred embodiment according to the present invention has been shown and described to detect a predetermined pressure in the system by means of the pressure sensor 18, it will be understood that if this method and system operates to continuously detect the pressure, the correcting process may be arranged to correct a map indicative of the relationship between the output voltage of the pressure sensor 18 and the pressure.

What is claimed is:

1. A leak diagnosis system for an evaporative emission control system connected to an internal combustion engine having an air induction passage, comprising:

an adsorbing means for temporally adsorbing evaporative fuel from a fuel tank storing fuel for the engine;

a purging means for purging the evaporative fuel of said adsorbing means to the engine;

a pressure detecting means for detecting a pressure value of the evaporative emission control system except for the fuel tank;

a base-pressure setting means for putting said pressure detecting means in the atmospheric pressure and obtaining the pressure value of said pressure detecting means in the atmospheric pressure;

a diagnosing-value correcting means for correcting the detection value of said pressure detecting means on the basis of the detected value of said pressure detecting means in the atmospheric pressure;

a decision-value setting means for setting a decision value on the basis of the detection value corrected by said diagnosing-value correcting means and a characteristics of said pressure detecting means;

a diagnosing means for diagnosing a leak condition of the evaporative purge system by changing the pressure in the evaporative emission control system to said decision value set by said decision value setting means.

2. A leak diagnosis system as claimed in claim 1, wherein the detected value of said pressure detecting means is directly proportional to the pressure to be detected by said pressure detecting means, where the linear function between the detected value of said pressure detecting means and the pressure has a constant gradient and a deviating intercept.

3. A leak diagnostic system as claimed in claim 1, wherein said decision value setting means sets said decision value corresponding to a positive pressure difference from the value obtained by said pressure detecting means in the atmospheric pressure; and wherein said diagnosing means raises the pressure in the evaporative emission control system until said value from said pressure detecting means equals said decision value.

4. A leak diagnosis system as claimed in claim 1, further comprising a vacuum switching means for switching a communicating condition of said adsorbing means with the air intake passage of the engine and a fresh-air guide switching means for switching a communicating condition of said adsorbing means with the atmosphere.

5. A leak diagnosis system as claimed in claim 4, wherein said diagnosis means executes the leak diagnosis of the evaporative emission control system on the basis of the detected pressure of said pressure detecting means when the pressure of the evaporative fuel from the fuel tank is increasing and both said vacuum switching means and said fresh-air guide switching means are put in the close state.

6. A leak diagnosis system as claimed in claim 4, wherein said diagnosing means executes the leak diagnosis by detecting the output of said pressure detecting means in a condition that the opening and closing of said vacuum switching means is selectively changed while said fresh-air guide switching means is closed.

7. A leak diagnosis system as claimed in claim 4, wherein said base-pressure setting means puts said pressure detecting means in the atmospheric pressure by setting said vacuum switching means in a close state and setting said fresh-air guide switching means in the open state.

8. A leak diagnosis system for an evaporative emission system connected to an internal combustion engine having an air induction passage, comprising:

a fuel tank for storing fuel used in the engine;

an evaporative fuel passage connected to said fuel tank;

a canister connected to said evaporative fuel passage;

a vent control valve connected to a fresh air guide port of said canister;

a vacuum cut valve installed to said evaporative fuel passage;

a bypass valve connected to said evaporative fuel passage to bypass said vacuum cut valve;

a purging passage connecting said canister and the air intake passage of the engine;

a purge control valve installed to said purging passage;

a pressure sensor installed to said purging passage to be located between said purge control valve and said canister;

a purge cut valve installed to said purging passage between said purge control valve and said pressure sensor;

a control unit electrically controlling open-and-close state of each of said bypass valve, said vent control valve, said purge control valve and said purge cut valve, said control unit obtaining a first output of said pressure sensor when said purge control valve, said purge cut valve and said bypass valve are closed and vent controlled valve is opened for a predetermined time, said control unit determining a leak decision value on the basis of a corrected value of said first output and a characteristic of said pressure sensor, said leak decision value to be compared with the output value in a leak detecting condition.

9. A leak diagnosis system for an evaporative emission system connected to an internal combustion engine having an air induction passage, comprising:

a fuel tank for storing fuel used in the engine;

an evaporative fuel passage connected to said fuel tank;

a canister connected to said evaporative fuel passage;

a vent control valve connected to a fresh air guide port of said canister;

a vacuum cut valve installed to said evaporative fuel passage;

a bypass valve connected to said evaporative fuel passage to bypass said vacuum cut valve;

a purging passage connecting said canister and the air intake passage of the engine;

a purge control valve installed to said purging passage;

a pressure sensor installed to said purging passage to be located between said purge control valve and said canister;

a purge cut valve installed to said purging passage between said purge control valve and said pressure sensor;

a first means for setting the pressure of said purge passage of said pressure sensor into the atmospheric pressure to correct an output value of said pressure sensor; and a second means for determining a leak decision value to be compared with the output value in a leak detecting condition, said leak decision value determined on the basis of the corrected output value of said pressure sensor and the characteristics of said pressure sensor.

10. A method for diagnosing a leak in an evaporative purge system connected to an internal combustion engine having an air induction passage, the method comprising the steps of:

temporally adsorbing evaporative fuel from a fuel tank storing fuel for the engine;

purging the stored evaporative fuel to the engine;

detecting a diagnosis pressure value of the evaporative emission control system except for the fuel tank by using a pressure sensor;

exposing a pressure detected portion to the atmospheric pressure so as to obtain a value of atmospheric pressure;

correcting the detected diagnosis pressure value on the basis of the obtained value of atmospheric pressure;

determining a decision value based on the corrected detected diagnosis pressure value and a characteristic of the pressure sensor; and diagnosing the leak condition of the evaporative purge system on the basis of the determined decision value.

* * * * *